US012761094B2

(12) United States Patent
Zhao et al.

(10) Patent No.: US 12,761,094 B2
(45) Date of Patent: Oct. 13, 2026

(54) HIGH-TEMPERATURE THIN-FILM STRAIN SENSOR

(71) Applicant: Xi'an Jiaotong University, Xi'an City (CN)

(72) Inventors: Yifan Zhao, Xi'an City (CN); Ge Wang, Xi'an City (CN); Fengwei Liu, Xi'an City (CN); Yaxin Zhang, Xi'an City (CN); Chenying Wang, Xi'an City (CN); Feng Han, Xi'an City (CN); Zhuangde Jiang, Xi'an City (CN)

( * ) Notice: Subject to any disclaimer, the term of this patent is extended or adjusted under 35 U.S.C. 154(b) by 282 days.

(21) Appl. No.: 18/782,000

(22) Filed: Jul. 23, 2024

(65) Prior Publication Data

US 2024/0393196 A1 Nov. 28, 2024

(51) Int. Cl.
*G01L 1/22* (2006.01)
*G01B 7/16* (2006.01)

(52) U.S. Cl.
CPC ............ *G01L 1/2293* (2013.01); *G01L 1/225* (2013.01); *G01B 7/18* (2013.01); *G01L 1/2281* (2013.01); *G01L 1/2287* (2013.01)

(58) Field of Classification Search
CPC ..... G01L 1/2293; G01L 1/2287; G01L 1/225; G01L 1/2281; G01B 7/18
See application file for complete search history.

(56) References Cited

U.S. PATENT DOCUMENTS 6,729,187 B1 * 5/2004 Gregory .................. H01C 7/06 73/765
8,097,330 B2 * 1/2012 Nashiki ................. G06F 3/0488 345/173
8,191,426 B2 * 6/2012 Gregory ........... H01C 17/06533 73/726
2005/0115329 A1 * 6/2005 Gregory ................ G01L 1/2287 73/777
2008/0020202 A1 * 1/2008 Nashiki ................. G06F 3/0488 428/337
2009/0050858 A1 * 2/2009 Katusic ................ C01G 19/006 252/520.1
2009/0145235 A1 * 6/2009 Gregory ................ G01L 1/2293 73/726
2024/0011758 A1 * 1/2024 Fendler ................. G01L 1/2287

FOREIGN PATENT DOCUMENTS

CN 117629050 A * 3/2024 ......... C23C 14/5806

* cited by examiner

*Primary Examiner* — Jonathan M Dunlap

(57) ABSTRACT

The present disclosure relates to the field of strain sensors, and specifically relates to a high-temperature thin-film strain sensor, including a substrate and a strain-sensitive grid. The strain-sensitive grid includes an indium tin oxide layer and a platinum layer, the indium tin oxide layer is deposited on the substrate, and the platinum layer is deposited on the indium tin oxide layer. The indium tin oxide layer contains 50% by mass of indium oxide and 50% by mass of tin oxide. The high-temperature thin-film strain sensor provided by the present disclosure can be used in an environment from room temperature to 500° C., and have extremely high sensitivity at a high temperature of 500° C. Unlike the conventional metal foil strain gauge with a thickness of several microns, the high-temperature thin-film strain grid has a thickness of 500 nm, which can better convey the strain of the measured object at high temperature.

9 Claims, 7 Drawing Sheets

HIGH-TEMPERATURE THIN-FILM STRAIN SENSOR

CROSS-REFERENCE TO RELATED APPLICATION

This application claims priority to Chinese Patent Application No. 202410859445.9, filed on Jun. 28, 2024 before the China National Intellectual Property Administration, the disclosure of which is incorporated herein by reference in entirety.

TECHNICAL FIELD

The present disclosure relates to the field of strain sensor, and in particular to a high-temperature thin-film strain sensor.

BACKGROUND

With the continuous development of the aerospace industry, the complex working environment poses a great challenge to the performance of aerospace engines, and many flight components have to work in high temperature, high pressure and strong vibration. Accurately sensing the use of various components of the aircraft and maintaining the normal operation of the aircraft rely on sensors used under various extreme conditions. In a high-temperature environment, many components of aerospace vehicles will produce a series of thermal stresses. Real-time monitoring of the magnitude of these thermal stresses is very important to ensure the flight safety of aerospace vehicles.

The resistance strain gauge is based on the resistance strain effect. The strain of the object being measured is obtained by detecting the change of resistance. During measurement, the resistance strain gauge is in direct contact with the object being measured and it can accurately reflect the strain of the object being measured. Common resistance strain gauges can be divided into wire type, foil type, thin film type and thick film type strain gauges according to the different preparation processes of sensitive grids. Among them, thin film strain gauges are prepared by thin film preparation methods such as laser pulse deposition, vacuum evaporation, and magnetron sputtering. During the operation, various parts of aerospace engines encounter complex environments of high temperature, high pressure, and strong vibration, and it is necessary to detect the thermal stress of the parts in real time. Temperature changes will cause the resistance of the strain gauge to change, and at the same time, the strain gauge and the object being measured will undergo thermal expansion, affecting the measurement of the real strain. The current commercial high-temperature strain gauges have a low operating temperature (within 200° C.) and a low sensitivity (about 2).

SUMMARY

In order to solve the above technical problems, the present disclosure provides a high-temperature thin film strain sensor, which has high sensitivity and fast response at high temperature, and has extremely high sensitivity under 500° C. insulation conditions. The high-temperature thin film strain sensor of the present disclosure has low invasiveness to the test environment, and the preparation material is resistant to high temperature, which solves the above problems well.

The present disclosure is specifically implemented by the following technical solutions.

A high-temperature thin-film strain sensor, comprising a substrate, a strain-sensitive grid is deposited on the substrate, the strain-sensitive grid is a composite thin film composed of an indium tin oxide layer and a platinum layer, the indium tin oxide layer is deposited on the substrate, and the platinum layer is deposited on the indium tin oxide layer.

The strain-sensitive grid comprises a plurality of longitudinal grids, the plurality of longitudinal grids are deposited in parallel on the substrate, transverse grids are respectively connected between two adjacent longitudinal grids, the transverse grids are deposited on the substrate, the longitudinal grids and the transverse grids form a continuous S-shaped structure, the two ends of the continuous S-shaped structure are respectively connected to ends of two transition grids, and the other ends of the two transition grids are respectively connected to electrodes.

The transverse grids, the longitudinal grids, the transition grids and the electrode are all composite thin films composed of an indium tin oxide layer and a platinum layer, the indium tin oxide layer is deposited on the substrate, and the platinum layer is deposited on the indium tin oxide layer.

ITO (i.e. indium tin oxide) and platinum have good temperature resistance, and the composite high-temperature thin-film strain sensor of ITO and Pt has a high gauge factor GF, which can reach more than 10 under laboratory conditions. At the same time, ITO has a negative temperature coefficient, Pt has a positive temperature coefficient, and the positive and negative temperature coefficients of the laminated film offset each other. The resistance is relatively stable as the temperature changes, reducing the influence of thermal output on the measurement of the strain sensitivity factor.

In an optional embodiment of the present disclosure, the mass fraction of indium oxide in the indium tin oxide layer is 50%, and the mass fraction of tin oxide in the indium tin oxide layer is 50%. ITO is a mixture of indium (III group) oxide ($In_2O_3$) and tin (IV group) oxide ($SnO_2$), usually with amass ratio of 90% $In_2O_3$ to 10% $SnO_2$. The ITO components used in the present disclosure includes indium oxide and tin oxide with a mass ratio of 5:5, and the ITO can have extremely high sensitivity under high temperature conditions of 500° C.

In an optional embodiment of the present disclosure, the thickness of the indium tin oxide layer is 450 nm, and the thickness of the platinum layer is 50 nm. Unlike the thickness of a few microns of conventional metal foil strain gauges, the thickness of the high-temperature thin-film strain grid in the present disclosure is 500 nm, which can better transmit the strain of the object being measured at high temperature.

In an optional embodiment of the present disclosure, the length of the S-shaped structure is 6.3 mm, the width thereof is 2.4 mm, the width of the longitudinal grids is 0.15 mm, and the spacing between two adjacent longitudinal grids is 0.3 mm.

In an optional embodiment of the present disclosure, the indium tin oxide layer and the platinum layer are deposited by magnetron sputtering.

In an optional embodiment of the present disclosure, the substrate is an aluminum oxide sheet with a thick of 0.5 mm, a length of 25 mm, and a width of 17 mm.

In an optional embodiment of the present disclosure, the strain sensor has a temperature resistance value of 500° C.

In an optional embodiment of the present disclosure, it is fixed to the surface of the component to be measured by high-temperature glue.

In an optional embodiment of the present disclosure, the electrode is brushed with conductive silver glue and connected to platinum wires to measure resistance change.

Compared with the prior art, the present disclosure has the following beneficial effects:

The present disclosure provides a thin film strain sensor used in a high temperature environment, wherein a strain-sensitive grid is deposited on a substrate, and the material of the strain-sensitive grid is a composite thin film composed of an indium tin oxide layer and a platinum layer, wherein the indium tin oxide layer is deposited on the substrate, and the platinum layer is deposited on the indium tin oxide layer, wherein the mass fraction of indium oxide contained in the indium tin oxide layer is 50%, and the mass fraction of tin oxide is 50%, and the strain sensitivity coefficient is relatively high at 500° C.

The strain-sensitive grid is deposited on the substrate and mounted on a high temperature-resistant, equal-strength cantilever beam, and the substrate transmits/conveys the strain of the cantilever beam to the strain-sensitive grid, and the strain-sensitive grid converts the strain into a change in resistance of a device. The strain sensitivity reflects the sensitivity of the strain-resistance signal conversion, the sensitivity of a general metal foil commercial strain gauge is about 2, and the temperature resistance is within 200° C. The high temperature thin film strain sensor of the present disclosure can be used in an environment from room temperature to 500° C., has extremely high sensitivity under the condition of 500° C. insulation, and has a relatively short response time at room temperature. Different from the thickness of several microns of conventional metal foil strain gauges, the thickness of high temperature thin film strain grid is 500 nm, which can better convey the strain of the measured object at high temperature.

DETAILED DESCRIPTION OF EMBODIMENTS

In order to enable those skilled in the art to better understand the technical solutions of the present disclosure and implement it, the present disclosure is further described below in conjunction with specific embodiments and drawings, but the embodiments are not intended to limit the present disclosure.

The experimental methods and detection methods described in the following embodiments are conventional methods unless otherwise specified; the reagents and materials described are available on the market unless otherwise specified.

Figure 1:
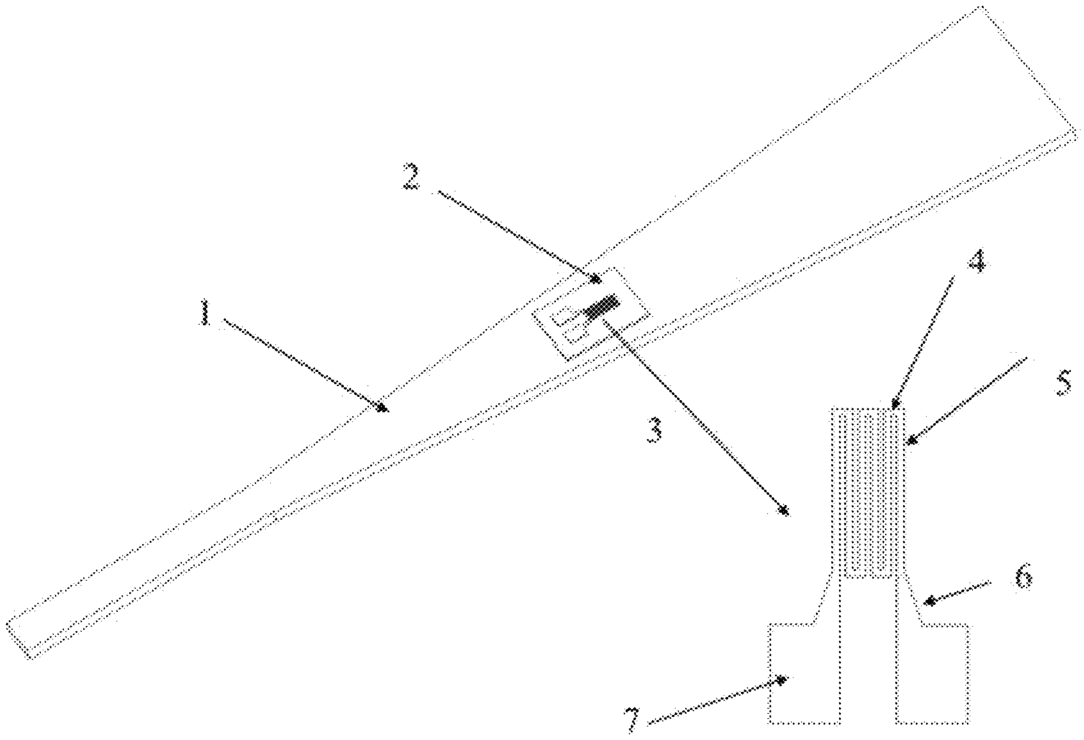
FIG. 1 is a schematic diagram showing the strain test of cantilever beam, wherein 1 is a cantilever beam; 2 is a substrate; 3 is a strain sensitive grid; 4 is a transverse grid; 5 is a longitudinal grid; 6 is a transition grid; 7 is an electrode.

The high-temperature thin film strain sensor provided by the present disclosure is deposited on a ceramic substrate, and the leads are connected with high-temperature conductive glue to output signals externally. As shown in FIG. 1, a strain-sensitive grid 3 is deposited on a substrate 2 (used to carry the strain-sensitive grid and convey strain). The strain-sensitive grid 3 includes a plurality of longitudinal grids 5 (used to detect the strain value). The plurality of longitudinal grids 5 are deposited in parallel on the substrate 2. Transverse grids 4 (playing a connecting role) are connected between two adjacent longitudinal grids 5. The transverse grids 4 are deposited on the substrate 2. The longitudinal grids 5 and the transverse grids 4 form a continuous S-shaped structure. The two ends of the continuous S-shaped structure are respectively connected to ends of transition grids 6 (used to connect the grid with the electrode). The other ends of the two transition grids 6 are respectively connected to electrodes 7 (connected to external lead wire to detect the resistance change of the strain gauge).

The materials of the transverse grids, longitudinal grids, transition grids and electrodes are all ITO and Pt composite thin films. A first sensitive layer ITO (the mass fraction of indium oxide in the indium tin oxide layer is 50% and the mass fraction of tin oxide is 50%) is deposited on an alumina ceramic substrate, the first sensitive layer is covered with a second sensitive layer Pt. When performing strain testing, the whole is fixed on an equal-strength cantilever beam 1 (used to generate strain) by high temperature glue. ITO and platinum have good temperature resistance. The composite high-temperature thin film strain sensor of ITO and Pt has a high gauge factor GF, which can reach more than 10 under laboratory conditions. At the same time, ITO has a negative temperature coefficient, Pt has a positive temperature coefficient, and the positive and negative temperature coefficients of the laminated film offset each other. The resistance is relatively stable with the change of temperature, which reduces the influence of thermal output on the measurement of strain sensitivity factor.

The deposition substrate of the high-temperature thin film strain sensor is a 0.5 mm aluminum oxide sheet with a length of 25 mm and a width of 17 mm.

The sensitive grid of the high-temperature thin film strain sensor is a composite laminated film of ITO (indium tin oxide) and Pt (platinum), with an overall thickness of 500 nm, of which the thickness of the indium tin oxide layer is 450 nm and the thickness of the platinum layer is 50 nm. The thin thickness can better convey the strain of the measured object at high temperature.

The overall length of the structure composed of the transverse grids and the longitudinal grids is 6.3 mm, the width is 2.4 mm, the width of the longitudinal grids is 0.15 mm, and the spacing between longitudinal grids is 0.3 mm.

Conductive silver glue is used to connect the platinum sheet carrying the platinum wire at the electrode, and the connection is established after hot pressing and air drying. The conductive silver glue has a maximum temperature resistance of up to 600° C., and is cured under normal temperature or heating condition, meeting the test conditions from normal temperature to 500° C.

The high-temperature glue is applied to the surface of the cantilever beam with a scraper, and the substrate of the strain sensor is pressed and fixed on the surface of the cantilever beam through the high-temperature glue, and the high-temperature glue is cured at normal temperature or heating condition. The working length of the equal-strength cantilever beam is 540 mm, the maximum width thereof is 60 mm, and the thickness thereof is 5 mm. The shape of the test area is an isosceles triangle, and the stress distribution on each cross section of the beam is uniform. The width of the free end of the beam is 15 mm and the length is 145 mm, it is convenient for loading stress by a dynamic load device. The material is 65 mn and the elastic modulus is 201 Gpa. No obvious plastic deformation occurs from room temperature to 600° C. The strain-sensitive grid is deposited on the substrate and installed on the high-temperature resistant equal-strength cantilever beam. The substrate conveys the cantilever beam strain to the strain-sensitive grid, and the strain-sensitive grid converts the strain into a change in resistance of a device. Strain sensitivity reflects the sensitivity of strain-resistance signal conversion. The present disclosure has high sensitivity (GF=45) and short response time ($\tau$<0.2 S) in a 500° C. environment.

In a 500° C. heat preservation environment, a dynamic alternating displacement is applied to a high-temperature thin film strain gauge through a cantilever beam, and the resistance of the strain gauge produces a regular waveform as the strain changes. The alternating displacement signal is set by a console and a servo motor, and it is set to a triangular wave to detect strain sensitivity. In one cycle, the free end of the cantilever beam is uniformly displaced to the maximum range and then rebounds. The average peak-to-peak value of the resistance-time curve in one detection cycle is regarded as the resistance change $\Delta R$, and the average trough is regarded as the initial resistance value $R_0$. The actual strain value $\Delta R$ of the strain grid is calculated according to the displacement of the free end of the cantilever beam (see formula (1)). The strain sensitivity of the sensor is calculated using formula (2).

$$GF = \frac{\Delta R}{R_0 \varepsilon} \tag{1}$$

$$\varepsilon = \frac{fh}{l^2}\beta \tag{2}$$

It should be noted that f is the downward displacement difference of the free end of the cantilever beam under pressure, and h is the thickness of the cantilever beam, which is 5 mm. 1 is the working length of the cantilever beam, which is 540 mm. B is the transmission coefficient of the surface strain of the cantilever beam to the strain-sensitive grid through the high-temperature glue and the substrate, which is 20% taken through experimental verification. A trapezoidal wave displacement signal is input into the console, the rise time is set to 0.02 S, the upper limit time and the lower limit time of the cantilever beam are both set to 5 S, and the relationship between the strain sensor resistance and time is recorded. The time difference of the resistance jumping from the lower limit to the upper limit is defined as the response time t. Compared with the normal temperature strain gauge, the high temperature resistance strain gauge has a wider working temperature and higher working temperature. At higher ambient temperatures, the material of the strain grid will face the risk of oxidation, and the introduction of unstable factors will cause measurement errors. The present disclosure selects high temperature-resistant metal oxide materials ITO (indium tin oxide) and Pt (platinum) as the material of the strain-sensitive grid, they are prepared on an aluminum oxide substrate by a lamination method. ITO of different components is obtained by controlling the mass fraction of indium oxide and tin oxide, and the strain sensitivities of composite thin film strain gauges with different components of ITO and Pt are compared.

The composite thin film strain gauges of TO and Pt with different components are prepared, and the specific preparation method is as follows:

Embodiment 1

A preparation method of a high-temperature thin-film strain sensor, comprising the following steps:

A strain-sensitive grid is deposited on a substrate, the strain-sensitive grid comprises a plurality of longitudinal grids, the plurality of longitudinal grids are deposited on the substrate in parallel, transverse grids are respectively connected between two adjacent longitudinal grids, the transverse grids are deposited on the substrate, the longitudinal grids and the transverse grids constitute a continuous S-shaped structure, the two ends of the continuous S-shaped structure are respectively connected to ends of two transition grids, and the other ends of the two transition grids are respectively connected to electrodes;

The transverse grids, longitudinal grids, transition grids and electrodes are all composite thin films composed of an indium tin oxide layer and a platinum layer, the indium tin oxide layer is deposited on the substrate, and the platinum layer is deposited on the indium tin oxide layer. ITO is deposited by magnetron sputtering, with a DC sputtering power of 60 W and a sputtering time of 2 hours. Pt is deposited on ITO by magnetron sputtering, with a DC sputtering power of 20 W and a sputtering time of 10 min. The mass fraction of indium oxide in the indium tin oxide layer is 50%, and the mass fraction of tin oxide is 50%.

Herein, the thickness of the ITO film is 450 nm, the thickness of the Pt film is 50 nm, and the overall thickness is 500 nm.

The alumina substrate is a 0.5 mm alumina sheet with a length of 25 mm and a width of 17 mm.

Comparative Example 1

Compared with Embodiment 1, a comparative example is provided, in which the ratio of indium oxide to tin oxide in the ITO and Pt laminated film is changed, the ratio of indium oxide to tin oxide is 9:1, and the steps are as follows:

A strain-sensitive grid is deposited on a substrate, and the strain-sensitive grid includes a plurality of longitudinal grids, the plurality of longitudinal grids are deposited on the substrate in parallel, and transverse grids are respectively connected between two adjacent longitudinal grids, and the transverse grids are deposited on the substrate, and the longitudinal grids and the transverse grids constitute a continuous S-shaped structure, and two ends of the continuous S-shaped structure are respectively connected to ends of two transition grids, and the other ends of the two transition grids are respectively connected to electrodes;

The transverse grids, the longitudinal grids, the transition grids and the electrodes are all composite films composed of an indium tin oxide layer and a platinum layer, and the indium tin oxide layer is deposited on the substrate, and the platinum layer is deposited on the indium tin oxide layer. ITO is deposited by magnetron sputtering, with a DC sputtering power of 60 W and a sputtering time of 2 hours. Pt is deposited on ITO by magnetron sputtering, with a DC sputtering power of 20 W and a sputtering time of 10 min.

The mass fraction of indium oxide in the indium tin oxide layer is 90%, and the mass fraction of tin oxide is 10%.

Herein, the thickness of the ITO film is 450 nm, the thickness of the Pt film is 50 nm, and the overall thickness is 500 nm.

The alumina substrate is a 0.5 mm alumina sheet with a length of 25 mm and a width of 17 mm.

The above-mentioned Embodiment 1 and Comparative Example 1 were tested. During the test, they were fixed on the equal-strength cantilever beam by high-temperature glue, and the platinum sheet carrying the platinum wire was connected to the electrode with conductive silver glue, and the connection was established after hot pressing and air drying. The conductive silver glue has a maximum temperature resistance of up to 600° C., and it is cured under normal temperature or heating condition, meeting the test conditions from normal temperature to 500° C. The working length of the equal-strength cantilever beam is 540 mm, the maximum width is 60 mm, and the thickness is 5 mm. The shape of the test area is an isosceles triangle, and the stress distribution on each cross section of the beam is uniform. The width of the free end of the beam is 15 mm and the length is 145 mm, it is convenient for loading stress by a dynamic load device. The material is 65 mn and the elastic modulus is 201 Gpa. No obvious plastic deformation occurs from room temperature to 600° C.

In a 500° C. insulation (heat preservation) environment, a dynamic alternating displacement is applied to the high-temperature thin film strain gauge through the cantilever beam. The resistance of the strain gauge produces a regular waveform as the strain changes. The alternating displacement signal is set using a console and a servo motor, and it is set to a triangular wave to detect strain sensitivity. In one cycle, the free end of the cantilever beam is uniformly displaced to the maximum range and then rebounds. The average peak-to-peak value of the resistance-time curve in one detection cycle is regarded as the resistance change ΔR, and the average trough is regarded as the initial resistance value $R_0$. The actual strain value ε of the strain grid is calculated based on the displacement of the free end of the cantilever beam (see formula (1)). The strain sensitivity of the sensor is calculated using formula (2).

$$GF = \frac{\Delta R}{R_0 \varepsilon} \tag{1}$$

$$\varepsilon = \frac{fh}{l^2}\beta \tag{2}$$

Herein, f is the downward displacement difference of the free end of the cantilever beam under pressure, and h is the thickness of the cantilever beam, which is 5 mm. 1 is the working length of the cantilever beam, which is 540 mm. β is the transmission coefficient of the surface strain of the cantilever beam to the strain-sensitive grid through the high-temperature glue and the substrate, it is verified by experiments to be 20%. A trapezoidal wave displacement signal is input into the console, the rise time is set to 0.02 S, the upper limit time and the lower limit time of the cantilever beam are both set to 5 S, and the relationship between the resistance of the strain sensor and time is recorded. The time difference of the resistance jumping from the lower limit to the upper limit is defined as the response time τ. In high-temperature strain measurement, temperature changes will cause the resistance of the strain gauge to change, and at the same time cause the strain gauge and the measured object to undergo thermal expansion, affecting the measurement of the real strain. In order to eliminate the false strain caused by temperature changes, the present disclosure performs strain testing under the condition of a constant temperature of 500° C. Keep the temperature at 500° C. for a period of time to improve the resistance stability of the strain gauge, and measure the resistance drift rate of the strain gauge to meet the conditions for measuring strain sensitivity.

In the present disclosure, ITO (indium oxide: tin oxide) and Pt with different mass fractions are deposited on an alumina substrate to prepare laminated composite thin film strain sensors (Embodiment 1 and Comparative Example 1). The electrodes are coated with conductive silver glue, connected with platinum wires, to measure the resistance change. The substrate is pressed and fixed on the central axis of the equal-strength cantilever beam by high-temperature glue, and high-temperature strain measurement is performed after curing. The strain sensor is placed in a high-temperature furnace and heated to a constant temperature, and the servo motor controls the pull rod to press down the free end of the cantilever beam.

The equal-strength cantilever beam is a strain generating device. The surface strain of the cantilever beam finally acts on the strain-sensitive grid through the high-temperature glue, substrate or other media, and the actual strain of the sensitive grid causes a change in resistance. There is a certain proportional relationship between the surface strain value of the cantilever beam and the actual strain value of the thin film strain grid.

Figure 2:
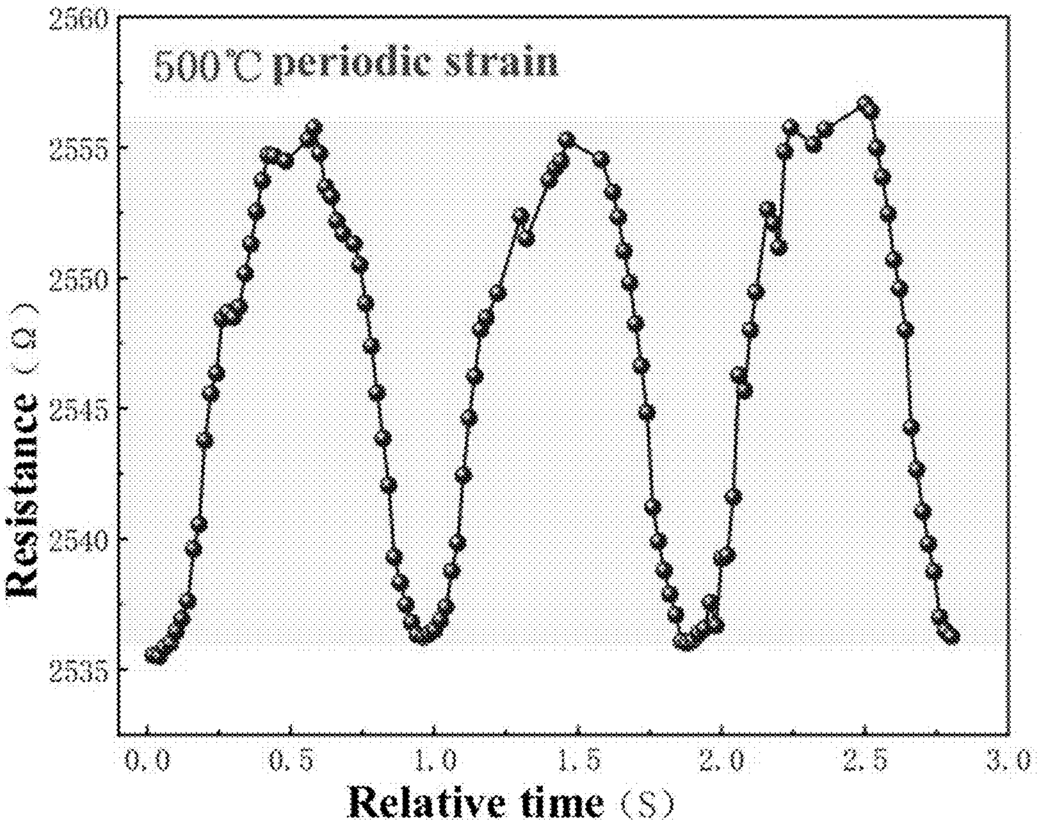
FIG. 2 shows the resistance change of strain gauge under 500° C. alternating stress in Embodiment 1.
Figure 3:
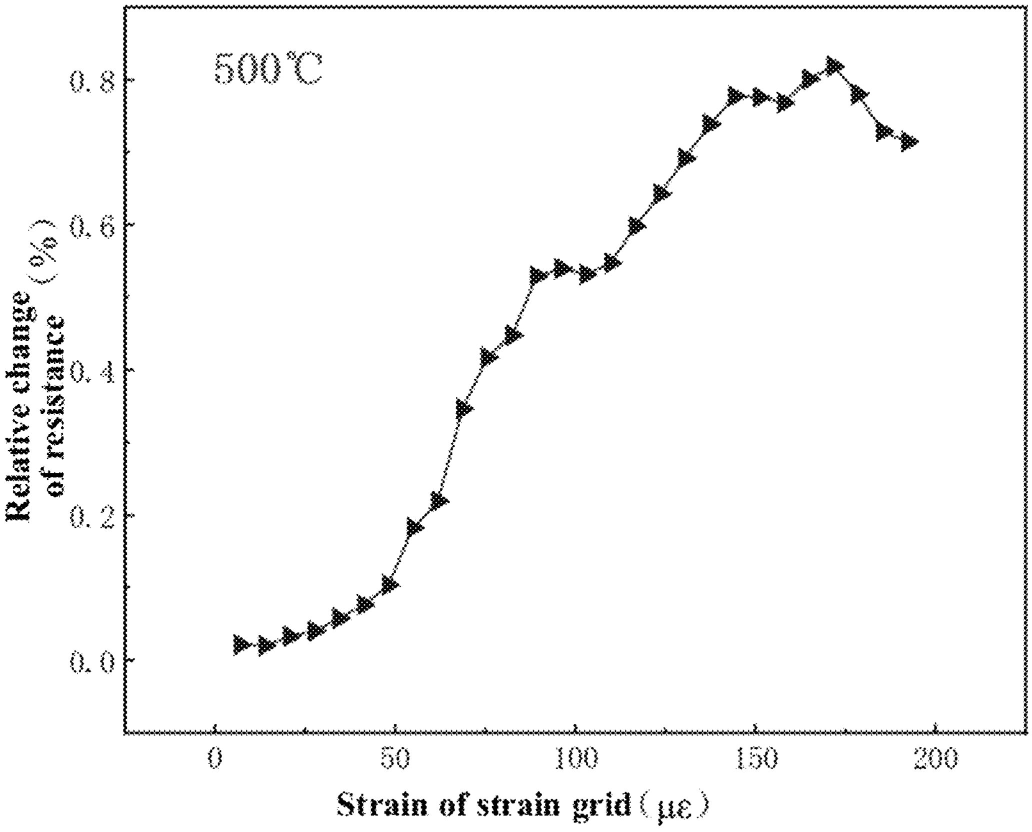
FIG. 3 shows the relationship between the relative change of strain grid resistance and the strain in Embodiment 1.

The control console is used in conjunction with the servo motor to input a triangular wave displacement signal to the free end of the cantilever beam, with a frequency of 1 HZ and a maximum displacement difference of 60 mm. During the process of applying downward pressure to the free end, the resistance of the strain sensor changes accordingly with the strain loading. The relationship between the relative change of resistance ΔR/R and the strain us of the cantilever beam is plotted. The slope of the curve is approximately the strain sensitivity of the sensitive grid under high temperature test environment. Composite laminated films of ITO and Pt with different compositions were prepared, wherein the thickness of the ITO film was 450 nm, the thickness of the Pt film was 50 nm, and the overall thickness was 500 nm. After testing, it was found that the composite thin film formed by ITO and Pt with a mass fraction of 5:5 showed high strain sensitivity when kept at 500° C. for a period of time. FIGS. 2 and 3 show that in the process of strain increasing from 0 to 200με, the overall resistance changed by 20Ω, and the strain sensitivity GF (gauge factor) was calculated to be about 45.

Figure 4:
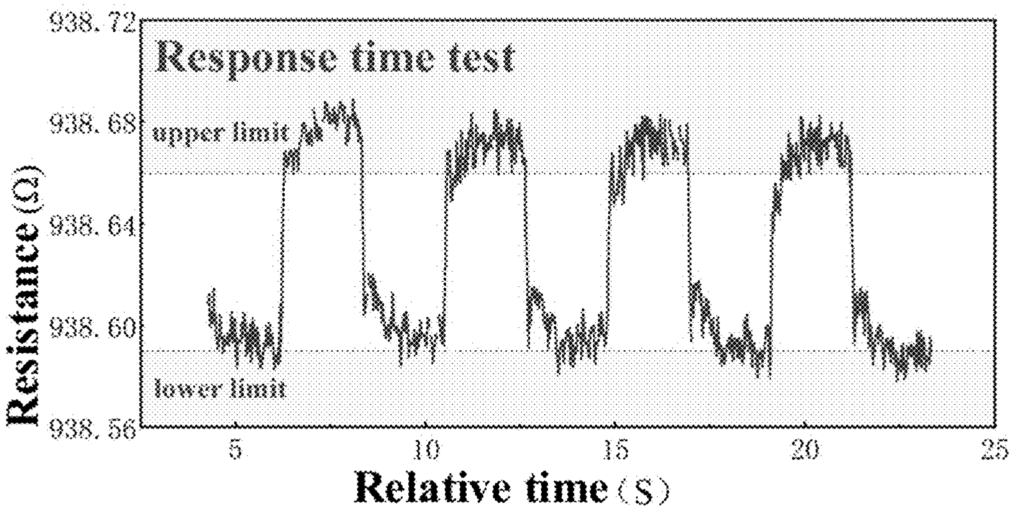
FIG. 4 shows the response time test of Embodiment 1.
Figure 5:
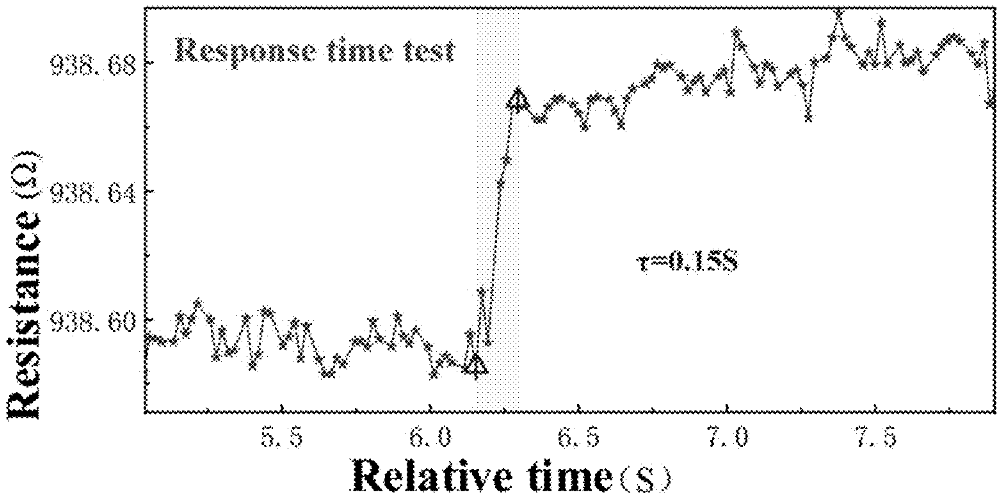
FIG. 5 shows the response time test of a step signal in Embodiment 1.
Figure 6:
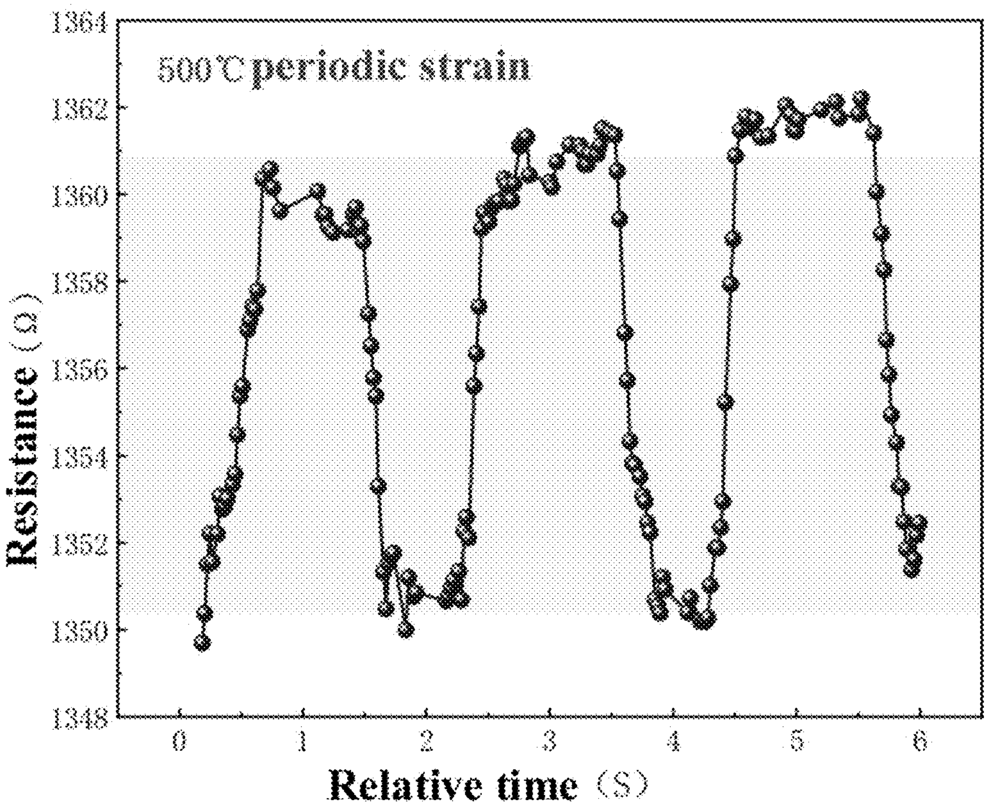
FIG. 6 shows the resistance change of strain gauge under 500° C. alternating stress in Comparative Example 1.
Figure 7:
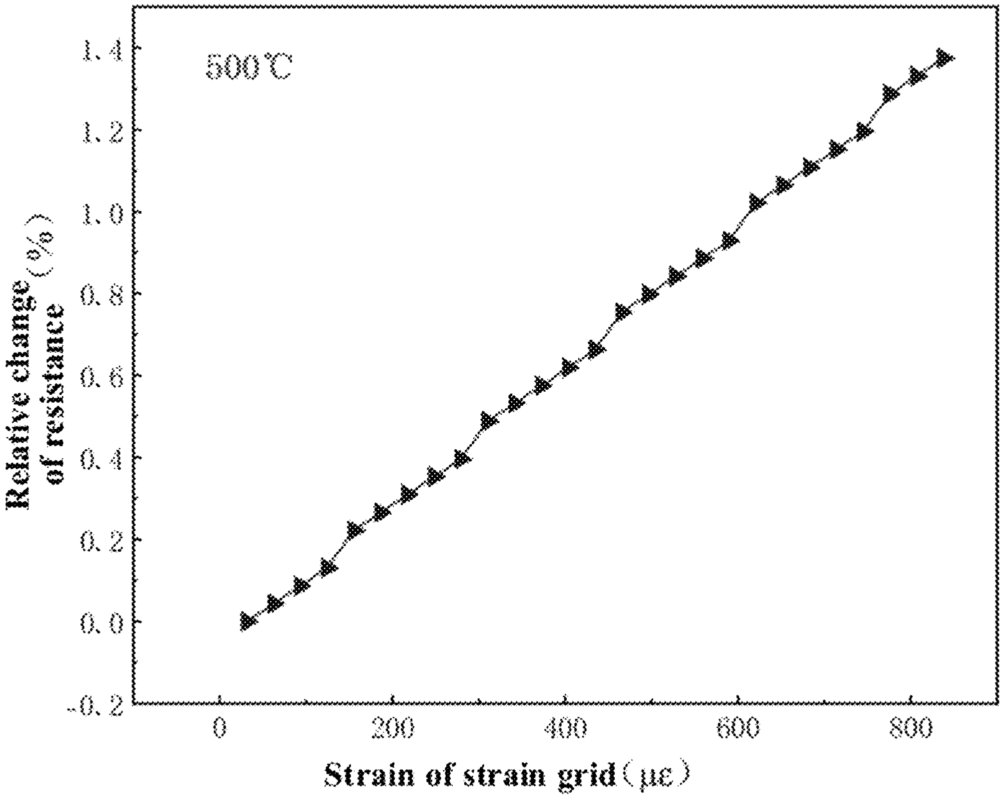
FIG. 7 shows the relationship between the relative change of strain grid resistance and the strain in Comparative Example 1.

The control console is used in conjunction with the servo motor to input a trapezoidal wave displacement signal to the free end of the cantilever beam, and it is maintained for a period of time at the upper and lower limits of the displacement. The time for the cantilever beam to rise from the lower limit to the upper limit is set to 0.02 S, which is approximately a step signal, as shown in FIG. 4. The resistance-time curve of the strain gauge when the cantilever beam reciprocates up and down, and the response time is calculated. The horizontal axis time difference corresponding to the end of the lower limit and the beginning of the upper limit in the image is recorded as the response time τ. The time difference corresponding to the resistance jump when a step signal occurs is taken at random. After calculation, τ<0.2 S, as shown in FIG. 5. FIG. 6 shows the change of strain gauge resistance under 500° C. alternating stress in Comparative Example 1, and FIG. 7 shows the relationship between the relative change of strain grid resistance and strain in Comparative Example 1. FIGS. 6 and 7 reflect the strain sensitivity together. By comparing the slopes of FIG. 3 and FIG. 7, the slope of FIG. 3 is greater than that of FIG. 7. The slope indicates sensitivity. The larger the slope is, the better the sensitivity is. By calculating the conversion unit, the slope of FIG. 3 is about 45, and the slope of FIG. 7 as a comparison is about 16, indicating that the performance of 5:5 is better than 9:1.

Obviously, various changes and modifications to the present disclosure can be made by those skilled in the art without departing from the spirit and scope of the present disclosure. Thus, the present disclosure is intended to include these changes and modifications of the present disclosure if they fall within the scope of the claims of the present disclosure and their equivalents.

What is claimed is:

1. A high-temperature thin-film strain sensor, comprising a substrate, wherein a strain-sensitive grid is deposited on the substrate, the strain-sensitive grid is a composite thin film composed of an indium tin oxide layer and a platinum layer, the indium tin oxide layer is deposited on the substrate, and the platinum layer is deposited on the indium tin oxide layer;

in the indium tin oxide layer, a mass fraction of indium oxide is 50%, and a mass fraction of tin oxide is 50%.

2. The high-temperature thin-film strain sensor according to claim 1, wherein the indium tin oxide layer has a thickness of 450 nm, and the platinum layer has a thickness of 50 nm.

3. The high-temperature thin-film strain sensor according to claim 1, wherein the strain-sensitive grid comprises a plurality of longitudinal grids, the plurality of longitudinal grids are deposited on the substrate in parallel, transverse grids are respectively connected between two adjacent longitudinal grids, the transverse grids are deposited on the substrate, the longitudinal grids and the transverse grids constitute a continuous S-shaped structure, two ends of the continuous S-shaped structure are respectively connected to ends of two transition grids, and the other ends of the two transition grids are respectively connected to electrodes;

the transverse grids, the longitudinal grids, the transition grids and the electrodes are all composite thin films composed of an indium tin oxide layer and a platinum layer.

4. The high-temperature thin-film strain sensor according to claim 3, wherein the S-shaped structure has a length of 6.3 mm, a width of 2.4 mm, the longitudinal grids have a width of 0.15 mm, and there is a spacing of 0.3 mm between two adjacent longitudinal grids.

5. The high-temperature thin-film strain sensor according to claim 3, wherein the electrodes are brushed with conductive silver glue and connected with platinum wires to measure resistance change.

6. The high-temperature thin-film strain sensor according to claim 1, wherein the indium tin oxide layer and the platinum layer are both deposited by magnetron sputtering.

7. The high-temperature thin-film strain sensor according to claim 1, wherein the substrate is an aluminum oxide sheet.

8. The high-temperature thin-film strain sensor according to claim 1, wherein the strain sensor has a sensitivity of GF=45 in a 500° C. environment and a response time $\tau$<0.2 S.

9. The high-temperature thin-film strain sensor according to claim 1, wherein the substrate is capable of being fixed to a surface of a component to be measured by high-temperature glue.

* * * * *